Jan. 18, 1955 R. M. OTIS ET AL 2,700,131
MEASUREMENT SYSTEM
Filed July 20, 1951 5 Sheets-Sheet 1

RUSSELL M. OTIS
ROBERT L. ALDER
INVENTORS

BY Lyle Dillon
ATTORNEY

RUSSELL M. OTIS
ROBERT L. ALDER
INVENTORS

BY Lyle Dillon
ATTORNEY

Jan. 18, 1955 R. M. OTIS ET AL 2,700,131
MEASUREMENT SYSTEM
Filed July 20, 1951 5 Sheets-Sheet 3

RUSSELL M. OTIS
ROBERT L. ALDER
INVENTORS

BY
ATTORNEY

RUSSELL M. OTIS
ROBERT L. ALDER
INVENTORS

BY Lyle Dillon
ATTORNEY

United States Patent Office 2,700,131
Patented Jan. 18, 1955

2,700,131

MEASUREMENT SYSTEM

Russell M. Otis, Pasadena, and Robert L. Alder, La Canada, Calif., assignors to Lane-Wells Company, Los Angeles, Calif., a corporation of Delaware Application July 20, 1951, Serial No. 237,786

18 Claims. (Cl. 324—1)

This invention relates in general to the transmission of signals, significant of physical quantity measurements, from within the depths of a well borehole to the surface exterior to the borehole, and more particularly to a system permitting the substantially continuous logging of a well borehole during and without interruption of the drilling operations.

In electrical logging of earth boreholes as heretofore conventionally practiced, a suitable source of electric current has been located either at the surface of the earth outside of the borehole or in a suitable container adapted to be lowered into the borehole, and the current therefrom has been applied, through either the insulated cable by which the container is lowered into the borehole or through suitable conductors associated with such container, to a portion of the penetrated geological strata to be tested, and the results of such test transmitted electrically up through the borehole to the earth surface through the same or separate insulated conductors in the cable. The lowering of suitable insulated conductors in the borehole of a drilling well together with the drill pipe in such manner that drilling and electrical operations can be carried on simultaneously has not been found to be practicable. Therefore, the usual practice heretofore employed has been to interrupt the drilling operations at suitable intervals to permit the removal of the drill pipe from the borehole and the running-in of the logging apparatus suspended upon a conductor cable while the drill pipe is removed therefrom.

This method of logging, as heretofore practiced, has a number of disadvantages, an important one of which is that control of the exact depth of drilling with respect to any given formation is difficult, with the result that in many cases the desired formation or the possible productive formation may have been drilled through or passed up before withdrawal of the drill pipe and the running of the logging apparatus, thereby possibly necessitating subsequent time-consuming and expensive corrective measures before the next progressive steps in the continued drilling or completion of the well can be undertaken.

Another serious disadvantage in the before-described conventional method of electrical logging resides in the now well established fact that the liquid from the drilling fluid in the well borehole invades the porous and permeable formations surrounding the borehole, thereby changing the electrical characteristics of the formations for a substantial distance laterally from the borehole walls. Such invasion of the formations by the liquid from the drilling fluid is progressive with the passage of time and, if permitted to continue for an appreciable length of time, results in sufficient contamination of the formations to cause possible confusion in the correct interpretation of the electrical characteristics of the formations thus explored.

The hereinbefore-mentioned difficulties encountered in connection with the conventional borehole logging systems are largely eliminated by the system of the present invention, which does not require insulated conductors extending throughout the length of the borehole from the point of measurement within the depths of the borehole to the top thereof at any time, but provides for the transmission of the electrical logging measurements or results of other operations within the depths of the borehole to the earth's surface without employing the usual interconnecting insulated conductors, and provides for the accomplishment of this while the drill pipe is in the well borehole and during drilling operations. The system of the present invention, furthermore, has the added advantage of permitting the logging or other measuring apparatus to be embodied in or contained in the drilling tools adjacent the drill bit and the process of electrical logging or other desired measurements to be made or carried on simultaneously with the drilling of the borehole, whereby such measurements can be made of the freshly penetrated formations before excessive invasion of liquid from the drilling fluid into the cut formations can take place.

As before indicated, an important advantage of the present invention resides in the substantially simultaneous drilling and logging of a formation which it makes possible, thereby permitting a continuous and more accurate determination of the formation penetrated by the drill than is possible by the intermittent, alternate drilling and logging operations heretofore usually employed. By employing the method and apparatus of the present invention, an electrical log may be made and observed while drilling operations are in progress, and the drilling operations modified as desired or stopped immediately at the time the electrical log being recorded indicates the desirability of such modification or stoppage.

Accordingly, an object of this invention is to provide a system for measuring a physical quantity within the depths of an earth borehole and the transmitting of such measurements to the earth's surface exterior to the borehole without employing any electrical circuit between the point of measurement and the exterior of the earth's surface.

Another object of this invention is to provide an electrical logging system which permits the carrying on of electrical logging operations and drilling operations simultaneously.

Another object of this invention is to provide a system for transmitting information from a point within the depths of a well borehole to a point at the surface outside of the borehole during drilling and while the drilling tools are present in the borehole.

The objects of the invention, broadly considered, are obtained by utilizing the circulating drilling fluid column in the drill stem as a transmission medium for fluid pressure variations initiated within the drill stem adjacent the drill bit, significant of the information to be transmitted from that point within the depths of the well borehole to the earth's surface. The thus initiated pressure variations arriving at the earth's surface through the drill stem and appearing in the drilling fluid circulating system at the top of the borehole are detected and recorded by suitable recording apparatus. Such recordings are then translated or interpreted in terms of the information thus transmitted.

Other objects, advantages, and features of novelty will be evident hereinafter in the more detailed description of the invention.

In the drawings, which illustrate preferred embodiments and modes of operation of the invention, and in which like reference characters designate the same or similar parts throughout the several views:

Figure 1 is an elevational view, partly schematic and partly in longitudinal section, illustrating the general arrangement of the apparatus of the invention as employed in connection with a typical drilling well;

Figures 2a and 2b are enlarged longitudinal sectional views of a portion of the apparatus of Figure 1;

Figure 3 is a view, partly in longitudinal elevation and partly in longitudinal section, as taken from line 3—3 of Figure 2a;

Figure 4 is a transverse sectional view taken on line 4—4 of Figure 2a;

Figure 5 is a fragmentary longitudinal sectional view of an alternative construction of that portion of the apparatus shown in Figure 2a;

Figure 6 is a schematic wiring diagram and diagrammatic illustration of a portion of the apparatus of Figure 5;

Figure 7 is a fragmentary longitudinal sectional view of another alternative construction of that portion of the apparatus shown in Figure 2a;

Figures 1, 3:
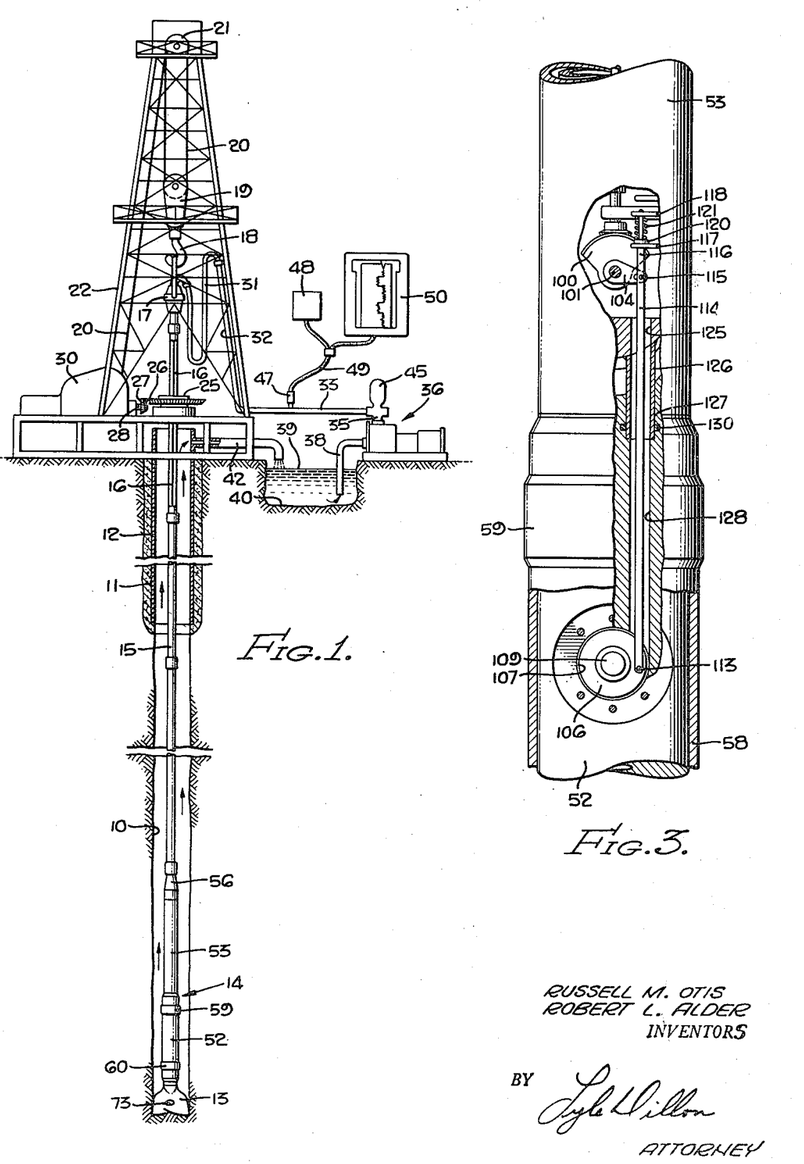

The apparatus is as follows:

Referring first primarily to Figure 1, in which the general disposition of the apparatus of the invention is shown in relation to a conventional drilling rig and a drilling well, 10 is the lower uncased portion of the borehole, and 11 the upper portion of the borehole, in which the usual surface string or conductor string of casing 12 has been set. Within the borehole and at the surface above the borehole is shown a conventional rotary drilling rig comprising a drill bit 13, a drill collar 14, and a drill stem composed of drill pipe 15 connected at its upper end through a square kelly bar 16 to a swivel 17, which in turn is suspended from a traveling block hook 18, traveling block 19, drilling lines 20, and crown block 21 located in the top of a derrick 22. The square kelly bar 16 passes through conventional gripping means in a rotary table 25 supported in the usual manner upon the derrick floor supports, and which is adapted to be rotated by means of the usual bevel gear and pinion rotary table drive illustrated at 26 and 27, respectively. The pinion 27 is coupled to be driven, in accordance with usual practice, through a shaft 28, by the power unit of a drawworks 30.

The circulation passage extending through the drill bit 13, drill collar 14, drill stem 15, kelly bar 16, and swivel 17 is connected through suitable flexible connections or hose 31 and riser and connecting pipes 32 and 33, respectively, to the discharge connection 35 of a drilling fluid circulating pump 36. The drilling fluid circulating pump 36 takes suction through pipe 38 from a body of drilling fluid 39 contained in a mud reservoir or sump 40. The upper end of the before-mentioned surface casing 12, which provides a return path for circulating drilling fluid from the open borehole therebelow, is provided with a lateral outlet pipe 42 which extends to and discharges into the drilling fluid reservoir 40.

A surge chamber 45 is preferably connected to the discharge 35 of the drilling fluid circulating pump 36 for the purpose of smoothing out or reducing the pump discharge pressure fluctuations.

A suitable pressure pick-up device 47 is connected hydraulically to the discharge pipe 33. The pressure pick-up device 47 may be of any suitable type, but preferably one such as, for example, the Statham Laboratories pressure transducer, Model No. P10, adapted to convert fluid pressure communicated to it from pipe 33 into corresponding values of electric current or potential. This transducer may be energized by a suitable electric current supply, such as the battery illustrated at 48 in Figure 1, and when so energized is capable of producing an electrical output signal which is a direct function of the instantaneous fluid pressure applied to it, which pressure in the present case is that appearing in pipe 33. The pressure pick-up device 47 is connected through insulated conductors 49 to a suitable pressure measuring device 50 which may be a pressure indicator or, preferably, a recorder such as, for example, the Minneapolis-Honeywell strip chart potentiometer recorder manufactured by the Minneapolis-Honeywell Regulator Company, and by means of which the pressure variations may be continuously recorded on a chart moving at a constant speed.

Referring now primarily to Figures 2a to 4, inclusive, and 10, the drill collar 14, before mentioned in connection with Figure 1, is there illustrated in enlarged fragmentary detail and partially in longitudinal section. This drill collar 14 comprises a substantially solid, cylindrical lower section 52 and a substantially hollow, tubular upper section 53 joined coaxially end to end at threaded connection 55. The upper tubular section 53 is joined at threaded connection 54 with an upper sub 56, which in turn is coupled to the lower section of the drill stem 15.

Figures 2A, 2B, 4:
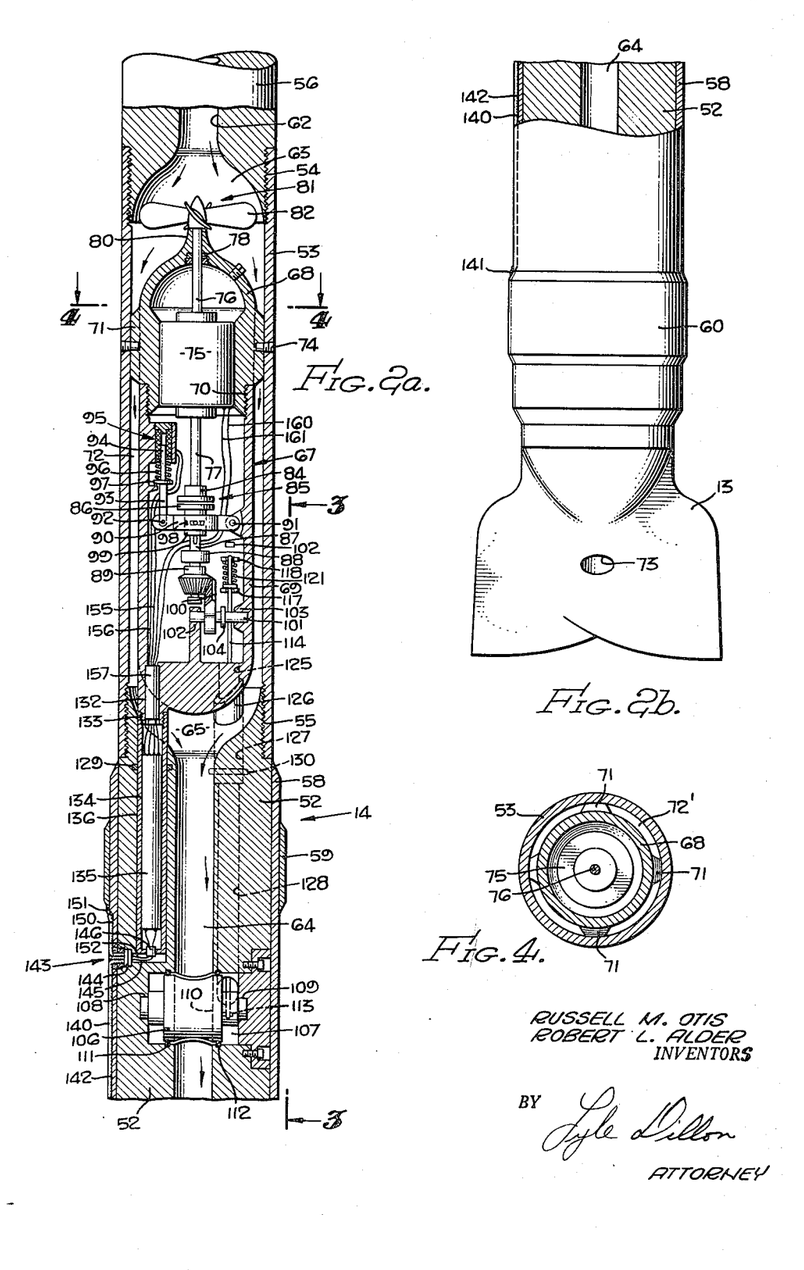

The lower portion 52 of the drill collar is covered over its exterior surface with an insulating coating or sleeve 58 made of a suitable insulating material, such as rubber, neoprene, Bakelite, or the like. The insulating sleeve 58 carries two external, longitudinally spaced-apart annular current input electrodes, as shown at 59 and 60. The annular electrodes 59 and 60 are thus insulated electrically from each other and from the drill collar. Other electrode arrangements may be employed, as hereinafter described.

The sub 56 has a central fluid passage 62, the lower end of which terminates in a diverging or expanding section 63 of a maximum inside diameter matching that of the inside diameter of the lower adjoining tubular section 53 of the drill collar. The lower section 52 of the drill collar also has a centrally located fluid duct 64 extending throughout its length, the upper end of which is formed with an upwardly diverging or expanding section 65 adjacent the joining threads 55, the expanding section serving to match the larger inside diameter of the tubular portion 53 of the drill collar to the inside diameter of the relatively smaller fluid duct 64.

Supported and centered within the tubular portion 53 of the drill collar is an elongated, fluid-tight, cylindrical housing 67 comprising a hollow upper nose section 68 and a hollow lower tail section 69 joined end to end at an intermediate point by threaded connection 70. The upper nose section 68 of the housing 67 is formed with a plurality of radially extending supporting ribs or vanes, as best shown at 71 in Figure 4, the outer edges of which fit within the cylindrical inside surface of the tubular section 53 of the drill collar and thereby serve to center and properly position the housing 67 concentrically therein, while at the same time providing a plurality of longitudinal by-pass fluid ducts, as shown at 72', intermediate the aforesaid vanes 71. The nose section 68 of the housing 67 is locked in position by means of a plurality of set screws 74 which are threaded through the wall of the tubular section 53 into engagement with suitable holes extending radially into the outer edges of the vanes 71. The housing 67 has an outside diameter which is considerably less than the inside diameter of the tubular section 53 of the drill collar, forming thereby an annular passage 72 extending around and along the full length of the housing 67, and serving to interconnect the upper fluid duct 62 and the lower fluid duct 64.

A continuous drilling fluid flow passage is thus provided, extending from the drill stem through duct 62, annular passage 72, and duct 64 into the upper end of the drill bit 13, and thence through the internal passages of the drill bit 13 to the fluid outlets, one of which is shown at 73.

Within the nose section 68 of the housing 67 is a generator 75 having its rotor shaft extending therethrough with an upwardly extending portion 76 and a downwardly extending portion 77. The upwardly extending shaft portion 76 of the generator 75 passes through a suitable stuffing box 78 and out centrally through the upper, pointed end portion of the nose section 68. Fixed to the outer end of shaft portion 76 is a rotor or impeller 81 having blades or vanes, as shown at 82, adapted to be rotated, and thereby to rotate the generator shaft 76, 77, by the downward flowing drilling fluid stream. Attached to the lower end portion 77 of the generator shaft is an upper element 84 of a clutch device 85. A lower plate element 86 of the clutch 85 is longitudinally slidably keyed to a longitudinal stub shaft 87 which is journaled in a suitable bearing 88, and has fixed to it at its lower end a pinion 89. The lower plate element 86 of the clutching device 85 is adapted to be moved longitudinally on the stub shaft 87, into and out of driving engagement with the upper plate member 84 by means of a finger lever 90 which is fulcrumed at 91 and which makes rotatable engagement at its midpoint with a circumferential groove 98 formed in the shank 99 of the lower clutch plate element 86. The end of the lever 90 opposite the fulcrum 91 is pivotally attached at 92 to the lower end of a rod 93 which constitutes an extension of a plunger 94 of an electromagnet 95. The electromagnet 95 is suitably supported in fixed position on the inside surface of the housing 67. A helical spring 96 surrounding the lower portion of the plunger 94 normally acts in compression against an annular sleeve member 97 formed at the juncture of the plunger 94 and the rod 93 to urge the plunger 94 and the rod 93 downward in a direction normally to maintain the lower clutch member 86 out of engagement with the upper clutch member 84. The pinion 89 fixed to the lower end of the stub shaft 87 meshes with a gear sector 100 which is fixed on a lateral shaft 101, which is in turn rotatably supported between bearings 102 and 103. The shaft 101 carries fixed to it, for rotation therewith through a limited angle, a crank or lever arm 104.

In the lower portion 52 of the drill collar and positioned across the fluid duct 64 is a rotary valve member 106 contained within a cylindrical recess 107 and rotatably mounted between bearings 108 and 109. The rotary valve 106 is formed with a diametral passage 110 which is of substantially the same inside diameter as that of the fluid duct 64 and which, when the valve is in its maximum open position, is coaxial therewith. A pair of O rings 111 and 112, confined within suitable, oppositely positioned, annular grooves formed in the end portion of the valve member 106 and the adjacent surrounding portions of the body of the drill collar, serve to form a seal or barrier between the fluid duct 64 and the end clearance space of the valve-containing recess 107.

The valve member 106 is provided with an eccentrically positioned, axially extending crank pin 113 which serves, as hereinafter more fully explained, as a crank means for imparting limited rotational movement to the valve 106 about its rotational axis. An elongated linkage rod 114 is pivotally connected at its lower end to crank pin 113 and is pivotally connected adjacent its upper end at 115 to the outer end of the lever 104. The upper end portion 116 of the linkage rod 114 extends upwardly beyond the pin connection 115 through aligned openings in a pair of stationary guide members 117 and 118 which are fixed to and extend inwardly from the inside surface of the housing 67. The linkage extension 116 has fixed to it, a short distance from its upper end, an annular flange 120. A helical spring 121 surrounding the upper end of the rod 116 acts in compression between the guide member 118 and the flange 120 to apply a downward force to the linkage rod 114, thereby normally maintaining the linkage rod 114 at its lowermost position, as shown in Figure 3, at which position the valve 106 is in its position of maximum opening.

The linkage rod 114 extends from the interior of the tail portion 69 of the housing 67 through a longitudinal opening 125 therein and thence through a contiguous tubular extension 126 thereof which bridges the fluid passage and extends into fluid-tight coupling connection at 127 with the upper end of the solid annular body of the lower portion 52 of the drill collar, and thence the linkage rod extends through another coaxial longitudinal passage 128 into the clearance space 107 at one end of the rotary valve, where it is pivotally connected to the valve crank pin 113, as before mentioned. An O ring 130 serves to aid in forming the fluid-tight seal between the before-described tubular extension 126 of the housing tail section 69 and the top of the lower section 52 of the drill collar.

On the lower end of the housing 67, and located substantially diametrically opposite the before-mentioned tubular housing extension 126, is another downwardly directed, tubular extension thereof, 132, to which is threaded at 133 an elongated, hollow, cylindrical container 134 which bridges the fluid passage 65 and extends into a cylindrical passage 136 formed in the top portion 52 of the lower drill collar section 52. An O ring seal 129 serves to form a fluid-tight barrier between the exterior of the container 134 and the surrounding wall of the cylindrical passage 136. Within the cylindrical container 134 is a hollow, cylindrical case 135 which is preferably fluid-tight and contains all of the elements of the electric circuits and apparatus diagrammatically represented within the enclosing dotted line 135a in Figure 10, which will be hereinafter more fully described.

An insulated electrical conductor 140 as shown in Figure 2b extends from its point of electrical contact and attachment 141 to the lower current input electrode 60 through or along a longitudinal groove 142 formed in the surface of the insulating sleeve 58 to a lateral opening 143 as shown in Figure 2a extending through the insulating sleeve 58, and thence through a suitable fluid-tight plug or connector device 144 to a conductor 145, which in turn passes through a fluid-tight entrance insulator 146 and into the case 135 to connection with a terminal 148. Another insulated electrical conductor 150 extends along the before-mentioned longitudinal groove 142 from its point of electrical contact and attachment 151 to the upper annular electrode 59 and thence through the connector 144 and through conductor 152 and entrance insulator 146 to terminal 153 within the case 135. While the lower annular, current input electrode 60 has been shown and described as electrically connected to terminal 148, and the upper annular, current input electrode 59 as connected to the terminal 153, these connections may be reversed, if desired, without affecting or changing the manner of operation of the electrical circuits or the apparatus.

A pair of insulated electrical conductors 155 and 156 lead from the windings of the electromagnet 95 through a suitable insulating lead-in seal 157 to terminals 158 and 159, respectively, inside of the case 135. Another pair of insulated conductors 160 and 161 similarly extend from the output of the generator 75 through the entrance insulator 157 to electrical connection with terminals 162 and 163 within the case 135.

Figure 10:
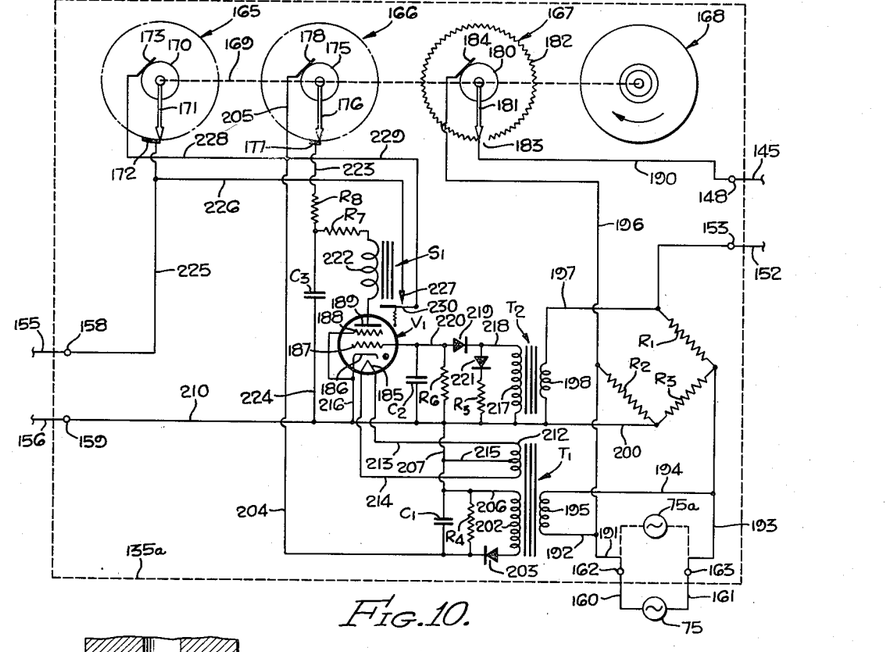
Figure 10 is a schematic wiring diagram of the electrical circuits of the apparatus of Figures 2a, 3, 7, 8, and 9.

Referring now to Figure 10, in which the before-mentioned electrical apparatus contained in the cylindrical case 135 is illustrated within the dotted enclosure 135a, 165 and 166 are rotary switches, and 167 is a rotary rheostat, all connected to and adapted to be rotationally operated in synchronism by suitable means, such as by being mounted upon a common drive shaft 169 which is coupled to a driving means 168 which is preferably a constant speed motor or a suitable clock mechanism. The rotary switch 165 comprises a slip ring 170 electrically connected to a rotatable contact arm 171 carried on the shaft 169, the contact arm 171 being adapted upon rotation to contact a stationary contact segment 172 once each revolution of the contact arm 171. Electrical contact is made with the slip ring 170 by means of a stationary brush 173.

The rotary switch 166 is constructed similar to the rotary switch 165 and comprises a slip ring 175, electrically connected to a rotatable contact arm 176 carried on the shaft 169, the contact arm being adapted upon rotation to make contact with a stationary contact segment 177 once for each revolution of the contact arm 176. Electrical contact is made with the slip ring 175 by means of a stationary brush 178. It is to be noted that the contact segment 172 is slightly longer than the contact segment 177.

The rotary rheostat 167 comprises a slip ring 180 electrically connected to a rotatable contact arm 181 carried on the shaft 169. The contact arm 181 makes continuous sliding contact with a circular resistance element 182 which is positioned concentric with the center of rotation of the contact arm 181 and the shaft 169. The circular resistance element 182 is provided with a short discontinuity, as shown at 183. Electrical connection is made with the slip ring 180 by means of a stationary brush 184.

A gas-filled electron tube or Thyratron is employed in the circuit, as illustrated at $V_1$, such electron tube having a cathode heater 185, cathode 186, control grid 187, screen grid 188, and anode 189.

As hereinbefore described, the drilling fluid-operated generator 75, from which the power for operation of the electrical circuit may be obtained, makes electrical connection through conductors 160 and 161 with the power input terminals 162 and 163, respectively. The power input terminals 162 and 163 are connected through conductors 191, 192 and 193, 194 to the primary winding 195 of a power transformer $T_1$. The power input terminal 162 is also connected through conductors 191 and 196 to the brush 184 of the rotary rheostat 167. Terminal 163 is also connected through conductor 193 and resistor $R_1$ to the electrode terminal 153 which, as hereinbefore described, is electrically connected to the current input electrode 59. One end of the resistance element 182 of the rotary rheostat 167, adjacent the discontinuity 183 therein, is connected through conductor 190 to the electrode terminal 148 which, as hereinbefore described, is electrically connected to the current input electrode 60.

A pair of resistors $R_2$ and $R_3$ are connected in series between the power supply conductors 193 and 196, and the midpoint between the resistors $R_2$ and $R_3$ connected through conductor 200 to one end of the primary winding 198 of transformer $T_2$. The other end of the primary winding 198 is connected through conductor 197 to the end of resistor $R_1$ which, as hereinbefore described, is connected to the electrode terminal 153.

One end of a secondary winding 202 of power transformer $T_1$ is connected through rectifier 203 and conductors 204 and 205 to the before-mentioned brush 178 of the rotary switch 166. The other end of the secondary winding 202 is connected through conductors 206 and 207 to a common bus wire 210, which is in turn connected at one end to the before-mentioned electromagnet terminal 159. The secondary winding 202 is shunted by a resistor $R_4$ and by a capacitor $C_1$. Another secondary winding 212 is connected through conductors 213 and 214 to the heater filament 185 of the Thyratron $V_1$. The secondary winding 212 is center-tap connected through conductor 215 to conductor 207, which is in turn connected to the before-mentioned bus conductor connection 210. The screen 188 and cathode 186 of Thyratron $V_1$ are also connected through conductor 216 to the common bus conductor 210.

The secondary winding 217 of transformer $T_2$ is connected at one end to the bus 210 and at the opposite end through conductor 218 to rectifier 219 and conductor 220 to the control grid 187 of Thyratron $V_1$. The secondary winding 217 is directly shunted by series-connected rectifier 221 and resistor $R_5$. The conductor 220 intermediate the control grid 187 and rectifier 219 is connected to the bus conductor 210 through capacitor $C_2$ and resistor $R_6$ in parallel with one another.

The anode 189 of Thyratron $V_1$ is connected through a field winding 222 of an eelctromagnetic relay $S_1$ and thence through resistors $R_7$ and $R_8$ and conductor 223 to the before-mentioned contact segment 177 of the rotary switch 166. The midpoint between resistors $R_7$ and $R_8$ is connected through a capacitor $C_3$ to the bus connection 210.

The electromagnet terminal 158 is connected through conductor 225 to the before-mentioned contact segment 172 of the rotary switch 165 and also through branch conductor connection 226 to contact point 227 of the relay $S_1$. The brush 173 of the rotary switch 165 is connected through conductor 228 to the before-mentioned conductors 204 and 205 and through conductor 229 to the armature 230 of the relay $S_1$.

Figures 5, 6:
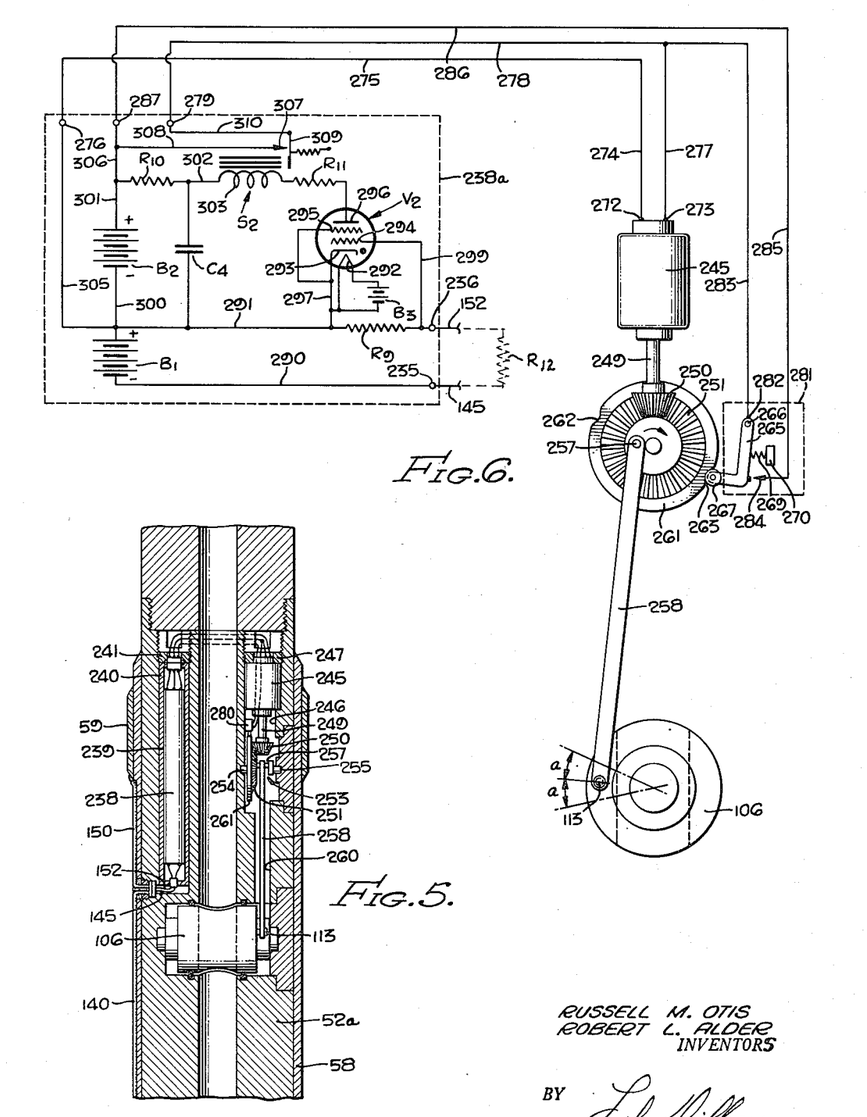

Referring next primarily to Figures 5 and 6, in which an alternative version of the apparatus of the present invention is illustrated, the electrodes 60 and 59 are connected through conductors 140, 145, and 150, 152, as hereinbefore described in connection with Figures 2a and 2b, to the terminals 235 and 236, respectively, of the electrical circuit illustrated within the dotted line 238a, which in this case is contained within the fluid-tight cylindrical container illustrated at 238 in Figure 5. The container 238, which is similar in construction to that illustrated at 134 in Figure 2a, is contained within the tubular housing 239, which in turn is retained by means of an annular retainer nut 241 within a suitable, laterally offset, longitudinal bore 240 formed in the top end portion of the lower section 52a of the drill collar.

An electric motor 245 is contained within a suitable, longitudinally extending bore or recess 246 laterally offset and diametrically opposite to the before-mentioned bore 240, and is retained there by means of an annular retainer nut 247. The shaft 249 of the motor 245 carries a bevel pinion 250 which meshes with a bevel gear 251. The bevel gear 251 is fixed to and supported for rotation upon a crankshaft 253, the opposite ends of which are rotatably supported in suitable bearings 254 and 255. The crank or throw 257 of the crankshaft 253 is rotatably connected to the upper end of a connecting rod or link member 258, which is in turn pivotally connected at its lower end to the crank pin 113 of the rotary valve member 106. The connecting rod or link 258 passes through a suitable fluid-tight passage 260, similar to that illustrated at 128 in Figure 2a, formed in the drill collar body 52a.

The bevel gear 251 carries as a part theerof, or attached thereto, a cam disc 261 having a pair of diametrically opposite, inwardly directed curves or depressions 262 and 263 formed in the periphery thereof. Switching apparatus adapted to be actuated by the cam disc 261 is positioned as indicated at 280 in Figure 5 and comprises the apparatus elements illustrated in more detail within the dotted enclosure 281 in Figure 6. Such apparatus contained in the before-mentioned dotted enclosure 281 representing the switching apparatus 280 comprises a cam follower having a lever arm 265 pivotally connected at one end at 266 to the drill collar body, and having rotatably connected at its opposite end a roller 267. The roller 267 is pressed into rolling contact with and follows the peripheral contour of the disc cam 261 by means of a helical spring 269 acting in compression between the mid portion of the cam follower arm 265 and a suitable buttress 270 fixed to the drill collar body.

The electrical power input terminals 272 and 273 of the electric motor 245 are respectively connected through conductors 274, 275 to terminal 276 and through conductors 277, 278 to terminal 279. The cam follower arm 265 is electrically connected at 282 through electrical conductor 283 to the before-mentioned conductor 278 and thence to the before-mentioned terminal 279. A stationary contactor point 284, positioned adjacent the cam follower arm 265 and adapted to make electrical contact therewith upon pivotal movement of the cam follower arm 265, is electrically connected through conductors 285 and 286 to terminal 287.

The before-mentioned electrical terminals 276, 287, and 279 lead to the electrical apparatus components diagrammatically illustrated within the dotted enclosure 238a in Figure 6 and which are contained within the cylindrical enclosure shown in Figure 5.

Contained within the cylindrical container 238, as before mentioned, is a suitable D. C. power supply, such as battery $B_1$. The negative end of the battery $B_1$ is connected through conductor 290 to the before-mentioned electrode terminal 235, which in turn is connected through conductors 145 and 140 to the current input electrode 60. The other end of the battery $B_1$ is connected through conductor 291 and resistor $R_9$ to the before-mentioned electrode terminal 236, which, as hereinbefore described, is connected through conductors 152 and 150 to the current input electrode 59. A gas-filled electron tube or Thyratron is employed, as indicated at $V_2$, which has a cathode heater 292, a cathode 293, control grid 294, screen grid 295, and anode 296. Current for the heater 292 is supplied by a suitable battery $B_3$. The screen grid 295 and the cathode 293 are connected together and through conductor 297 to conductor 291. The control grid 294 is connected through conductor 299 to the electrode terminal 236.

The negative terminal of a D. C. voltage supply, such as battery $B_2$, is connected through conductor 300 to the beforementioned conductor 291. The positive terminal of the battery $B_2$ is connected through conductor 301, resistor $R_{10}$, conductor 302, field winding 303 of an electromagnetic relay $S_2$, and resistor $R_{11}$ to the anode 296 of the Thyratron $V_2$. The negative and positive terminals of the voltage supply battery $B_2$ are also connected respectively through conductors 305 and 306 to the terminals 276 and 287. The stationary contactor point 307 of the relay $S_2$ is connected by way of conductor 308 to the terminal 287, and the armature 309 of the relay $S_2$ is connected through conductor 310 to terminal 279.

Figure 7:
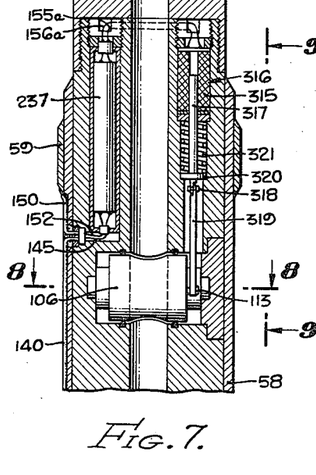
Figure 8:
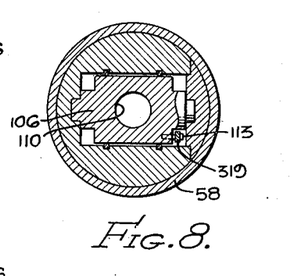
Figure 8 is a cross-sectional view taken on line 8—8 of Figure 7.
Figure 9:
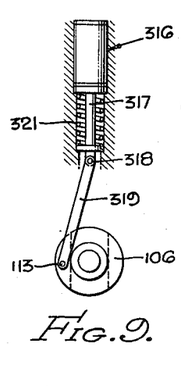
Figure 9 is a fragmentary longitudinal sectional view of a portion of Figure 7, as viewed from line 9—9.

Referring now primarily to Figures 7, 8, and 9, in which another alternative version of the apparatus of this invention is illustrated, the cylindrical case 237 is similar to that illustrated at 135 in Figure 2a and contains within it the electrical components diagrammatically illustrated within the dotted enclosure 135a of Figure 10, except that, instead of employing the external alternating current generator 75, as shown in Figure 2a, a suitable source of alternating current 75a, contained within the enclosure, may be employed.

The electrode terminals 153 and 148 are connected to the current input electrodes 59 and 60, respectively, through conductors 152, 150, and 145, 140 in the same manner as hereinbefore described in connection with the apparatus of Figures 2a, 2b, and 5. Terminals 158 and 159 are connected through conductors 155a and 156a to the coil 315 of an electromagnet 316. The plunger 317 of the electromagnet 316 is pivotally connected at its lower end 318 to a connecting rod or linkage member 319, which is in turn pivotally connected at its lower end to the crank pin 113 of the rotary valve 106. The lower end of the plunger 317 carries fixed thereto a flared portion 320 forming a shoulder against which a helical spring 321 acts under compression urging the said plunger 317 and linkage 319 downward toward a position in which the rotary valve 106 is in its maximum open position when the coil of the electromagnet is deenergized.

The operation of the apparatus of the invention is as follows:

Referring primarily to Figure 1, the drilling fluid, which is usually in the form of an aqueous drilling mud as commonly employed in the oil well drilling industry, is continuously withdrawn from the reservoir or sump 40 through the suction pipe 38 of the drilling fluid circulating pump 36 and discharged under pressure from pump 36 through pipes 33 and 32, through the flexible hose 31, and thence through the swivel 17 into the fluid passage in the square kelly bar 16. The drilling fluid continues in its flow downward through the kelly 16, through the sections of the drill pipe comprising the drill stem 15, and through the sections 53 and 52, respectively, of the drill collar to the drill bit 13, from which it is discharged from the drill bit fluid outlet 73 into the bottom of the borehole surrounding the drill bit. From the bottom of the borehole the drilling fluid, together with cuttings from the drill bit, flows upward through the annular space in the borehole 10 surrounding the drill stem and up through the surface string of casing 12, from which it overflows through the lateral outlet pipe or ditch 42 through which it returns to the sump 40.

The surge chamber 45 partially absorbs and smooths out the drilling fluid flow pressure pulsations from the pump 36, resulting in flow of the drilling fluid from the pump to and throughout the drill stem, in which the pressure pulsations and fluctuations are of relatively low amplitude. Meanwhile, the rotation of the drill stem and drill bit by means of the rotary table 25 may or may not be simultaneously maintained, as the occasion dictates.

Referring now first to the operation of the apparatus of Figures 1 to 4, inclusive, and Figure 10, the drilling fluid, caused to flow down through the drill stem as before described, impinges on the impeller 81 and thereby drives the generator 75. The alternating current from generator 75 energizes the primary 195 of the power supply transformer T₁ through the before-described electrical connections 160 and 161 which lead to the circuit terminals 162 and 163 illustrated in Figure 10, and thence through conductors 192, 193, and 194 completing the connections to the primary 195.

The generator 75 is also connected through terminals 162 and 163 and through conductors 196 and 193 across, and serves as the alternating supply for, the bridge circuit comprising resistors $R_1$, $R_2$, and $R_3$. The variable resistance of resistor 182 of the rotary rheostat 167 connected in series with the varying resistance appearing between the current input electrodes 59 and 60 constitutes the fourth leg of the bridge circuit.

As hereinbefore described, the rotary switches 165 and 166 and the rotary rheostat 167 are driven in synchronism and at substantially constant clockwise rotational speed by means of the drive mechanism 168, which may be an electric motor or suitable clockwork. The speed of rotation of these rotary switches and the rheostat is preferably relatively low, such as, for example, one rotation in several minutes.

When the contacting arm 181 of the rheostat 167 is at a position during its rotation, as illustrated in Figure 10, such that none of the resistance 182 is in the circuit between the conductors 190 and 196, the contacting arms 171 and 176 of the rotary switches 165 and 166, respectively, are at their positions of initial contact with the stationary contact segments 172 and 177. As the rotary switches 165 and 166 are slowly rotated, the contacting arm 176 makes electrical contact with the contacting segment 177 for a brief interval of time sufficient to permit capacitor $C_3$ to be fully charged through resistor $R_3$ at a D. C. potential corresponding to the rectified A. C. potential from the secondary 202 of the power supply transformer T₁. During this interval, the charging current for capacitor $C_3$ flows from the secondary 202 of the power supply transformer T₁ through the rectifier 203, conductors 204 and 205, to brush 178, through slip ring 175, contact arm 176, contact segment 177, conductor 223, and resistor $R_3$ to the capacitor $C_3$, and return through conductor 224, bus 210, and conductors 207 and 206 to complete the circuit to the opposite end of the secondary 202. In the course of the continuing rotation, the switch arm 176 breaks contact with the contact segment 177 and does not again make contact with it until a substantially complete revolution of the switching mechanism has been made.

At the same time that contact arm 176 initiates contact with segment 177, the contact arm 171 of the rotary switch 165 initiates contact with its segment 172. The contact segment 172 being somewhat longer than segment 177, the contact arm 171 makes contact with the segment 172 for a somewhat longer period of time which is made equal to the desired duration of the pressure pulse at the initiation of a measuring cycle as hereinafter more fully described. The duration of contact between contact arm 171 and segment 172 may be, for example, two or three seconds.

During the time interval in which the contact arm 171 of the rotary switch 165 is in sliding electrical contact with segment 172, the electrical circuit is thereby completed from the power supply to and through the coil of electromagnet 95 (Figure 2a), resulting in current flow from the secondary 202 of transformer T₁ through rectifier 203, conductors 204 and 228, brush 173, slip ring 170, contact arm 171, contact segment 172, conductor 225, terminal 158, and conductor 155 to the before-mentioned coil of electromagnet 95 and return through conductor 156, terminal 159, bus connection 210, and conductors 207 and 206 to the secondary 202. The resultant energization of electromagnet 95 causes the plunger 93 to move upward, as viewed in Figure 2a, carrying with it the finger lever 90 and thereby moving the lower element 86 of the clutch 85 into engagement with the upper element 84. The generator shaft 77 is thereby coupled to the stub shaft 87, imparting rotation therethrough from the rotating generator shaft as driven by the impeller 81 to the pinion 89 and the gear sector 100. Rotational displacement is thus imparted to the gear sector 100 and to the crank 104, resulting in upward motion of the link rod 114 for a distance sufficient to bring the upper end thereof into contact with the stop abutment 102. At this point the gear sector 100 can rotate no further, and slippage occurs between the elements 84 and 86 of the clutch 85 for the balance of the time interval during which the contact arm 171 is passing over the contact sector 172. The link rod 114 being pivotally connected to the crank pin 113, as hereinbefore described, the rotary valve member 106 is thereby rotated to a partially closed position, resulting in a pressure drop therethrough which appears as increased fluid pressure in the fluid flow duct 64 immediately above the valve 106 and throughout the drill stem thereabove. A pulse of increased pressure is thereby produced in the flowing drilling fluid which immediately extends upstream throughout the drill stem and interconnecting piping to the discharge of the drilling fluid pump 36, which fluid pressure pulse has a duration equal to the time that the contact arm 171 of the rotary switch 165 is passing over the contact sector 172. This fluid pressure pulse is sensed by the pressure pick-up device 47 and is recorded on the moving chart of recorder 50, as illustrated at $P_1$ in Figure 11. The width W of the recorded pulse $P_1$ is commensurate with the time interval during which the arm 171 remains in moving contact with contact sector 172, as before mentioned.

At the end of the period during which the electromagnet 95 is thus energized, the spring 96 returns the clutch 85 to its disengaged position, and the spring 121 acting on the link rod 114 returns the rotary valve 106 to its former fully opened position.

It is to be noted that one end of the resistance 182 of the rotary rheostat 167 is connected through conductor 190, terminal 148, and conductors 145 and 140 to electrode 60, and that electrode 59 is connected through conductors 150 and 152 and terminal 153 to one juncture of the bridge circuit at the end of resistor $R_1$. The resistance 182 of the rotary rheostat 167 is thus placed in series with whatever resistance appears between the current input electrodes 59 and 60 as they pass through the borehole. As the contact arm 181 of the rotary rheostat 167 continues to move at substantially a constant rate along resistor 182, resistance is thereby gradually introduced in series, as before mentioned, with the resistance appearing between the electrodes 59 and 60. When, after a time interval of $t_1$, the total of the resistance introduced by the rotary rheostat 167 and that appearing between the electrodes 59 and 60 bears the same ratio to the resistance of resistor $R_2$ as the resistance of resistor $R_1$ bears to that of resistor $R_3$, the bridge circuit at that instant will have been brought into a state of balance, with the result that no potential appears across the primary 198 of transformer $T_2$, and consequently no alternating potential then appears across the secondary 217. This in turn results in the rectified voltage otherwise appearing between the conductor 220 and bus 210 across capacitor $C_2$ falling to zero, in turn resulting in the potential on the control grid 187 likewise falling to zero with respect to the cathode 186. At this instant, when the potential of the control grid 187 is reduced to zero, the Thyratron $V_1$ becomes conducting, permitting the charge which had previously been imparted to capacitor $C_3$, as hereinbefore described, to discharge through conductors 216 and 224, through the Thyratron $V_1$, and through relay winding 222 and resistor $R_7$.

The resultant energization of the relay $S_1$ closes the contact between the relay armature 230 and contact point 227, permitting current to flow to the electromagnet 95 from the secondary of transformer $T_1$ through the rectifier 203, conductors 204 and 229, armature 230, contact 227, conductors 226 and 225, terminal 158, and conductor 155 to the coil of electromagnet 95, and return through conductor 156, terminal 159, conductor bus 210, and conductors 207 and 206 to the secondary of transformer $T_1$. At some time during the discharge of capacitor $C_3$ through the Thyratron $V_1$, as hereinbefore described, the relay $S_1$ will again open, either due to the current through the relay coil 222 being reduced during the discharge of capacitor $C_3$ to a value insufficient to hold the relay closed, or due to the anode-cathode voltage on the Thyratron $V_1$ falling, for the same reason, to a value insufficient to maintain the tube conducting. In any event, the result is that the relay $S_1$ opens at a predetermined time after the beginning of the discharge of capacitor $C_3$, and the resistor $R_7$ preferably has a value such that the time required to discharge the capacitor $C_3$ to a condition at which the relay $S_1$ opens is of the order of one to three seconds and preferably for a shorter time duration than that of the contact of arm 171 with segment 172. The electromagnet 95 being energized in the manner just described, resulting from a momentary state of balance of the bridge circuit causing the electron tube $V_1$ to become conducting, produces a second pressure pulse in the drilling fluid stream above the rotary valve 106 in the same manner as that hereinbefore described. This second pressure pulse is sensed by the pressure pick-up device 47 and is recorded on the moving chart of the recorder 50, as illustrated at $p_1$ in Figure 11. The width $w$ of the recorded pulse $p_1$ is commensurate with the before-mentioned time duration of discharge of condenser $C_3$ through electron tube $V_1$, and, as before mentioned, is preferably of shorter duration or at least of a different duration time from that of pulse $P_1$, for the purpose of avoiding any ambiguity in identifying the pulses. The time interval $t_1$ between the initial pulse $P_1$ and the second pulse $p_1$ corresponds to that time required for the contact arm 181 to travel around the resistance 182 from its position of minimum resistance, as illustrated in Figure 10, to that at which sufficient resistance is introduced thereby to bring the bridge circuit to balance, as before mentioned.

After the tube $V_1$ has become non-conducting following discharge of capacitor $C_3$, capacitor $C_3$ cannot again be charged and the tube $V_1$ cannot again become conducting until the contact arm 171, after a period of time $T_1$, completes its rotational cycle to return to its position of initial contact with sector 177 to complete the cycle and begin a new measuring cycle with a pressure pulse $P_2$. These cycles of operation are repeated so long as the apparatus is kept in operation.

Thus, in the cycle of operation just described, the ratio of time interval $t_1$ to time interval $T_1$ is proportional to the ratio of the fractional amount of the resistance 182 introduced at rheostat 167 into the current pick-up electrode leg of the bridge circuit at the instant of balance, to the total resistance of the resistance element 182. Likewise, at any given subsequent cycle of operation, N, the ratio $$\frac{t_n}{T_n}$$

is proportional to the ratio of the fractional amount of the resistance introduced into the current pick-up electrode leg of the bridge circuit at the instant of balance, to the total resistance of the element 182. The ratio $$\frac{t_n}{T_n}$$

thus becomes an inverse function of the resistance appearing between the current input electrodes at the instant of balance of the bridge circuit in any given cycle N of operation of the rotating switches and rheostat.

Referring now primarily to the operation of the apparatus of Figures 7, 8, and 9, this apparatus may be employed in connection with the electrical circuit illustrated in Figure 10 in place of the apparatus illustrated in Figures 2a and 2b. In this arrangement the electrical circuit illustrated in Figure 10 is, as hereinbefore described, contained within the cylindrical container 237 shown in Figure 7, and the terminals 158 and 159 are connected through conductors 155a and 156a directly to the coil 315 of the electromagnet 316. The electromagnet 316 is thus energized by the electrical apparatus illustrated in Figure 10 in the same manner and at the same time intervals as hereinbefore described in connection with the electromagnet 95 of Figure 2a.

Each time the electromagnet 316 is thus energized, it causes the electromagnet plunger 317 and the connecting rod or linkage member 319 to move upward against the compressive force of the helical spring 321. Upon each such upward motion, the connecting rod 319, being pivotally attached to the crank pin 113, causes a rotational displacement of the rotary valve 106 to a position partially restricting the fluid flow through the drill collar, with the result that a pressure rise is produced in the drilling fluid stream above the valve 106, which extends upward through the drill stem to the discharge of the drilling fluid pump 36, and which is picked up by the pressure pick-up device 47 and recorded, as hereinbefore more fully described in connection with the operation of the apparatus of Figure 2a.

Reference is now made to the operation of the apparatus of Figures 5 and 6. It is assumed, first, for convenience of illustration, that the cycle of events in the operation of the apparatus has progressed to the condition illustrated in Figure 6, in which the roller 267 of the cam follower arm 265 is lying in the cam depression 263. At this time the contacts of the switching mechanism 281 comprising the follower arm 265 and contact point 284 are open, the contacts of relay $S_2$ comprising the armature 309 and contact point 307 are also open, and the Thyratron tube $V_2$ is in a non-conducting condition, having just completed a conducting cycle. The voltage across the capacitor $C_4$ will thus, at that instant, be that corresponding to the extinction voltage of the Thyratron $V_2$. Immediately following this, the voltage of the capacitor $C_4$ starts building up at a rate determined by the time constant of the circuit comprising the capacitor $C_4$, the battery $B_2$, and the resistor $R_{10}$.

The voltage across the resistor $R_9$ is, for a given voltage of the battery $B_1$, determined by the formation resistance, illustrated in dotted lines at $R_{12}$, appearing between the current input electrodes 60 and 59 which are, as hereinbefore described, connected to the terminals 235 and 236. Thus current may flow from the battery $B_1$ through conductors 290, 145, and 140 to current input electrode 60, and from electrode 60 through the drilling fluid in the well borehole and through a portion of the surrounding formations (illustrated at $R_{12}$) to electrode 59, and from electrode 59 in return through conductors 150 and 152, resistor $R_9$, and conductor 291 to the battery $B_1$. The voltage drop across the resistor $R_9$ will therefore be an inverse function of the electrical resistance $R_{12}$ appearing between electrodes 59 and 60, as before stated. The negative voltage of the control grid 294 with respect to the cathode 293 will be the same as that appearing across resistor $R_9$, and therefore will also be an inverse function of the resistance appearing between electrodes 59 and 60. For different negative voltages of the control grid 294 with respect to the cathode 293, the Thyratron $V_2$ has a correspondingly different firing voltage between the anode 296 and cathode 293 at which it will become conducting. Thus, for any given negative potential of the control grid 294, the electron tube $V_2$ will remain non-conducting for a period of time sufficient for the voltage across capacitor $C_4$ to build up, as hereinbefore described, to the particular firing voltage corresponding to that particular grid potential. When the potential across condenser C₄ has thus risen to the firing potential, as before mentioned, tube V₂ will become conducting, resulting in the discharge of condenser C₄ through the winding 303 of relay S₂ and through resistor R₁₁. Therefore, for any given control grid potential the length of the time interval from the beginning of the charging of condenser C₄ to the instant of discharge thereof through the tube V₂ is a function of the control grid potential at that time. For example, if the potential of the control grid 294, with respect to the cathode 293, becomes more negative, the time interval between the beginning of charge and the discharge of condenser C₄ will increase, and, if the potential of the control grid 294, with respect to the cathode 293, becomes less negative, the time interval will decrease. The time intervals between discharges of condenser C₄ through tube V₂ thus are determined by the value of the resistance R₁₂ appearing between electrodes 59 and 60.

The time of duration of each discharge of the capacitor C₄ through the windings 303 of the relay S₂, resistor R₁₁, and through the Thyratron V₂ may be adjusted, between suitable limits, by variation of the resistor R₁₁. The resistors R₁₀ and R₁₁ are preferably adjusted so that the rate of charge of capacitor C₄ from battery B₂ is relatively low as compared to the rate of discharge through tube V₂.

Each time the tube V₂ becomes conducting, the current discharged therethrough from capacitor C₄ passes through the coil 303 of relay S₂, resulting in the closing of the circuit between the relay armature 309 and contact point 307, which in turn results in closing the circuit between the battery B₂ and the motor 245, permitting current to flow from battery B₂ through conductors 300, 305, 275, and 274, to terminal 272 of the motor 245 and return from motor terminal 273 through conductors 277, 278, 310, 308, 306, and 301 to battery B₂. Each time the relay S₂ is thus closed and current permitted to flow to the motor 245, the motor shaft 249 and bevel pinion 250 thereon are set into rotation, resulting in rotation of the bevel gear 251 in the direction indicated by the arrow. Immediately the gear 251 carrying the cam disc 262 is put into rotation, the roller 267 is lifted out of the depression 263, causing the follower arm 265 to pivot counterclockwise about point 266 a distance sufficient to bring it into contact with contact point 284, thereby closing the electrical circuit between conductors 285 and 283, which by way of conductors 286 and 278 are connected in parallel or across the relay contacts 307, 309. The electrical circuit from battery B₂ through the motor 245 is thus maintained closed independent of the time of opening of the contacts of relay S₂ until the cam disc 261 has rotated through an angle of 180°, at which point the roller 267 will drop into the opposite cam depression 262, thereby opening the circuit between the follower arm 265 and contact 284, and thereby deenergizing the motor 245 and stopping further rotation of the cam. By this arrangement, therefore, each time the capacitor C₄ has discharged itself through the Thyratron V₂ to a potential where the Thyratron is no longer conducting and the current through the coil 303 of the relay S₂ ceases to flow, resulting in the opening of the contacts 307, 309 of the relay S₂, the motor 245 nevertheless continues to rotate until the roller 267 falls into the next-approaching depression 180° from that at which the operation was initiated, at which time the contact between follower arm 265 and point 284 opens and the motor 245 comes to rest.

Thus, each time the gear 251 is rotated 180°, the connecting linkage 258 moves either downward or upward, thereby rotating the valve 106 correspondingly either in one or the other direction from its maximum open position to a position partially obstructing or presenting a resistance to flow of the drilling fluid passage through the duct and through the valve. By this action the valve 106 is alternately rotated downward through a displacement angle $a$ and upward through a displacement angle $a$, as indicated in Figure 6, each time obstructing or presenting a resistance to flow of the fluid flow therethrough to an approximately equal degree. Since each such motion of the valve takes place relatively rapidly, preferably over a period of two or three seconds, a fluid pressure pulse of approximately the same duration appears in the drilling fluid flow stream extending upstream from the valve 106 to the fluid pump discharge line at the earth's surface.

The time scale of the before-described cycle of operations and the number of repetitions thereof may be chosen at intervals of time and a number of times as desired in accordance with the average number of observations per unit of time and the total number of observations which it is desired to make. The time interval between pulses is a function of the potential drop appearing across resistor R₉ and is therefore an inverse function of the formation resistance appearing between electrodes 59 and 60. As the drill collar proceeds downwardly in the drilling of the well borehole past various formations having different resistances, the resistance appearing between the electrodes 59 and 60 correspondingly changes, resulting in corresponding changes in the time interval between operations of the Thyratron circuit. In this manner, the time interval between fluid pulses appearing in the fluid stream at the earth's surface is made to vary inversely with or in a manner indicative of the resistance of the formations traversed by the borehole.

Figure 12:
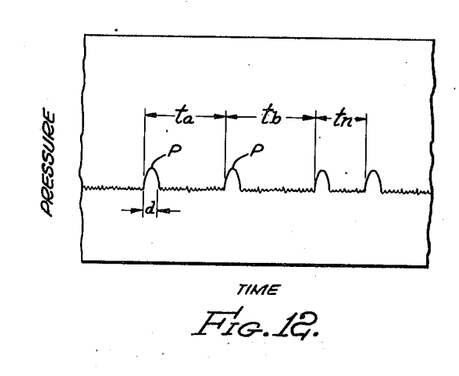
Figure 12 is a view of a recorded log chart typical of that produced in connection with the operation of the apparatus of Figures 1, 5, and 6.

The fluid pressure pulses are detected by the pressure pick-up device 47 and recorded on the moving chart, as shown at P in Figure 12, the width $d$ of each pulse being commensurate with the time interval required for each half revolution of the cam disc 261. The time intervals, $t_a$, $t_b$, etc., between each of the pressure pulses P are thus inverse functions of the effective resistance appearing between the current pick-up electrodes 59 and 60 during each cycle of operation of the apparatus.

Figure 11:
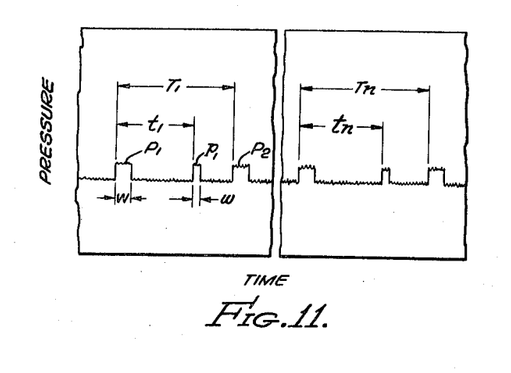
Figure 11 is a view of a recorded log chart typical of that produced in connection with the operation of the apparatus shown in Figures 1 to 4, inclusive, and 7 to 10, inclusive.
Figure 13:
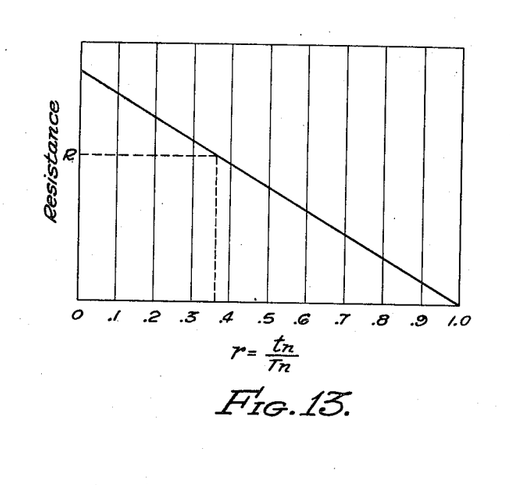
Figure 13 is a typical graph for evaluating a log chart of the type illustrated in Figure 11.
Figure 14:
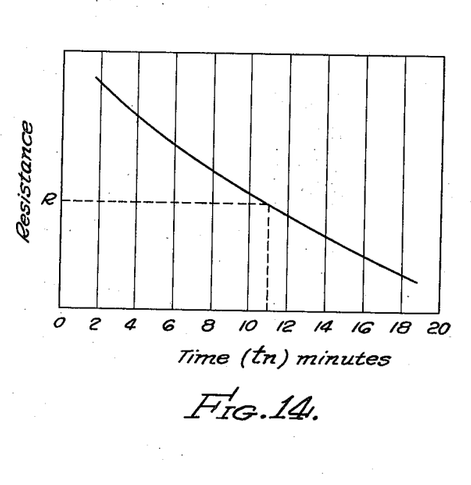
Figure 14 is a typical graph for evaluating a log chart of the type illustrated in Figure 12.

By placing varied known resistances between the current pick-up electrodes 59 and 60, the apparatus, including the electrical circuits of Figures 6 and 10, can be calibrated and the calibration data represented in graphical form, as illustrated in Figures 14 and 13, respectively. By determining $r$, the ratio $$\frac{t_n}{T_n}$$

from the record chart, as illustrated in Figure 11, and applying it to the graph of Figure 13, the corresponding resistances R appearing between the pick-up electrodes 59 and 60 can be determined.

Likewise, by determining the time interval $t_a$, $t_b$, or $t_n$, occurring between any given pair of pulses P, from the record chart, as illustrated in Figure 12, and applying it to a suitable graph, such as illustrated in Figure 14, the corresponding resistance R between the pick-up electrodes 59 and 60 can be determined.

The apparatus has been herein described as located within the drill collar. However, the term "drill collar" as herein used is not to be limited to the exact construction or location conventionally employed, but shall mean any suitable container forming a part of the drill stem, drill collar, or drill bit, but usually located in the lower part of the drill stem.

Measuring the resistance or resistivity or other quantities specified herein is not to be limited in meaning to actual quantitative determination of such values in terms of ohms or the like, but shall include the actuation of any means or device, such as an ammeter, voltmeter or the like, whereby a visual indication or graphical record of a measure of such resistance or resistivity values or suitable functions thereof or changes therein may be obtained.

The current input electrodes are not limited in construction to two separate electrodes, as herein illustrated, but may comprise one electrode suitably located on the drill collar and with the drill bit serving as the other electrode, particularly where it is desired to locate the measurements as close to the bottom of the drill hole as possible. Suitable structure of this type is shown in the copending application of Arps, Serial No. 185,849.

While the resistance element 182 of the rheostate 167 is shown and described in connection with Figure 10 as being connected in series with the resistance appearing across the electrodes 59 and 60 and forming one leg of the bridge circuit including the resistors R₁, R₂, and R₃ in the other legs thereof, other arrangements of the bridge circuit are obviously possible. For example, if desired, the resistance element 182 of the rheostat 167 may be connected in any desired leg of the bridge circuit either in series or parallel with the connections leading to the electrodes 59 and 60, or, if desired, the resistance element 182 may be connected in one leg of the bridge circuit and the connections to the electrodes 59 and 60 connected in another leg thereof.

Parameter measurements which may be made by the method and apparatus of this invention are not limited to those of formation resistance or resistivity, as illustrated herein, but may be extended to any parameter which can be expressed in or converted to an electrical quantity. Thus, for example, the apparatus of Figure 6 is adapted to measure any quantity that can be converted to a potential difference, by applying such potential difference between the control grid 294 and the cathode 293 of tube $V_2$ by suitable means, such as by applying a corresponding electrical signal, potential or current across resistance $R_9$ or $R_{12}$. Resistance $R_{12}$ may not only be representative of formation resistance, as when the system is used in connection with electrical logging, but instead may, by use of suitable transducers well known in the art, be made to be any resistance indicative of other quantities, such as temperature, force, pressure, angle, direction, radioactivity, natural potential, and the like. The apparatus of Figure 10 is similarly adaptable.

In conventional drilling practice the drilling fluid is usually circulated by positive displacement pumps run at substantially constant speed, thereby forcing the rate of fluid flow through the drill stem to remain substantially constant. Therefore, the means for or steps of "obstructing," "restricting," "restriction," "flow variations" or the like as employed herein in the specification and claims are not limited in meaning necessarily to changing the rate of flow of the fluid, but include means for or steps of imposing resistance to such flow of fluid which is manifested by an up-stream pressure change.

It is to be understood that the foregoing is illustrative only of the preferred embodiment of the inventors and that the invention is not to be limited thereby, but includes all modifications thereof within the scope of the appended claims.

What is claimed is:

1. Well borehole apparatus comprising: a drill collar having a fluid circulation duct therethrough; flow restriction means in said drill collar actuatable for effecting a variable resistance to flow of fluid through said duct; means in said drill collar for momentarily actuating said flow restriction means a first time and a second time separated by a reference time interval; and means responsive to an electrical quantity for momentarily actuating said flow restriction means at a time intermediate said first and second times and after a measurement time interval following said first time, said time intervals having a ratio bearing a predetermined functional relationship to the values of said electrical quantity.

2. Well borehole apparatus comprising: a drill collar having a fluid circulation duct therethrough; flow restriction means in said drill collar actuatable for effecting a variable resistance to flow of fluid through said duct; means in said drill collar for momentarily actuating said flow restriction means a first time and a second time separated by a reference time interval; and means responsive to an electrical quantity for momentarily actuating said flow restriction means at another time and after a measurement time interval following said first time, said time intervals having a ratio bearing a predetermined functional relationship to the value of said electrical quantity.

3. Well borehole apparatus according to claim 2 in which said first means and said second means comprise apparatus for actuating said flow restriction means to effect flow resistances of different durations whereby said reference interval and said measurement intervals can be identified.

4. Well borehole apparatus comprising: a drill collar having a fluid circulation duct therethrough; flow restriction means in said drill collar actuatable for effecting a variable resistance to flow of fluid through said duct; a first means in said drill collar for momentarily actuating said flow restriction means a first time and a second time separated by a reference time interval; and a second means responsive to an electric potential for momentarily actuating said flow restriction means at another time and after a measurement time interval following said first time, said time intervals having a ratio bearing a predetermined functional relationship to the value of said electric potential.

5. Well borehole apparatus comprising: a drill collar having a fluid circulation duct therethrough; flow restriction means in said drill collar movable between positions permitting relative free flow and resisted flow of fluid through said duct; mechanism in said drill collar, actuatable for imparting momentary movement of said flow restriction means from a free flow position to a flow resisting position and return; means to actuate said mechanism a first time and then, following a reference time interval, to actuate said mechanism a second time; and means responsive to an electrical potential to actuate said mechanism at another time intermediate said first time and said second time and after a measurement time interval following said first time, said time intervals having a ratio bearing a predetermined functional relationship to the value of said potential.

6. Well borehole measurement apparatus comprising: a drill collar having a fluid circulation duct therethrough; flow restriction means in said drill collar movable between positions permitting relative free flow and resisted flow of fluid through said duct; mechanism in said drill collar, actuatable for imparting momentary movement of said flow restriction means from a free flow position to a flow resisting position and return; a pair of electrode elements insulated from one another and attached to said drill collar in position to be placed in electrical communication with surrounding borehole formations; means to actuate said mechanism a first time and then, following a reference time interval, to actuate said mechanism a second time; and means responsive to the values of the electrical resistance appearing between said electrode elements also to actuate said mechanism at another time during said reference time interval after a measurement time interval following said first time, said time intervals having a ratio bearing a predetermined functional relationship to the values of said resistance.

7. Well borehole measurement apparatus comprising: a drill collar having a fluid circulation duct therethrough; flow restriction means in said drill collar movable between positions permitting relative free flow and resisted flow of fluid through said duct; mechanism in said drill collar, actuatable for imparting momentary movement of said flow restriction means from a free flow position to a flow resisting position and return; a pair of electrode elements insulated from one another and attached to said drill collar in position to be placed in electrical communication with surrounding borehole formations; means to actuate said mechanism a first time and then, following a reference time interval, to actuate said mechanism a second time; and means responsive to the values of the electrical resistance appearing between said electrode elements also to actuate said mechanism at another time after a measurement time interval following said first time, said time intervals having a ratio bearing a predetermined functional relationship to the values of said resistance.

8. Well borehole apparatus comprising: a drill collar having a fluid circulation duct therethrough; an impeller in said duct positioned to be driven by fluid flow through said duct; valve means in said duct; mechanism in said drill collar for moving said valve means between positions effecting different fluid flow resistances through said duct; an engageable and disengageable clutch means for drivingly coupling said impeller to said mechanism; timing means responsive to an electric quantity for actuating said clutch means at time intervals having a predetermined functional relationship to the values of said electric quantity existing during said intervals.

9. Well borehole measurement apparatus comprising: a drill collar having a fluid circulation duct therethrough; an impeller in said duct positioned to be driven by fluid flow through said duct; valve means in said duct; mechanism in said drill collar for moving said valve means between positions effecting different fluid flow resistances through said duct; an engageable and disengageable clutch means for drivingly coupling said impeller to said mechanism; timing means for actuating said clutch means at consecutive reference time intervals; and means responsive to the values of a resistance to be measured also to actuate said clutch means at times during said before-mentioned reference time intervals and bearing a time relationship thereto indicative of the values of said resistance.

10. Well borehole measurement apparatus comprising: a drill collar having a fluid circulation duct therethrough; an impeller in said duct positioned to be driven by fluid flow through said duct; valve means in said duct; mechanism in said drill collar for moving said valve means between positions effecting different fluid flow restrictions through said duct; an engageable and disengageable clutch means for drivingly coupling said impeller to said mechanism; a pair of electrode elements insulated from one another and attached to said drill collar in position to be placed in electrical communication with surrounding borehole formations; means for actuating said clutch means at consecutive time intervals; and means responsive to the values of the electrical resistance appearing between said electrode elements also to actuate said clutch means at times during said before-mentioned time intervals and bearing a time relationship thereto indicative of the values of said electrical resistance.

11. Well borehole measurement apparatus including a drill collar having a fluid circulating duct therethrough, and containing therein: a switching means; a rheostat means; driving means for effecting substantially continuous variations of the resistance of said rheostat and for operation of said switching means each time the resistance of said rheostat reaches a predetermined value; a bridge circuit of which the resistance of said rheostat forms at least a portion of a leg thereof; means to connect a resistance to be measured in a leg of said bridge circuit; and means in said fluid circulating duct and actuated by said switching means for producing a fluid pulse in said duct for each said operation of said switching means, and controlled by said bridge circuit for producing a fluid pulse in said duct each time the varying resistance of said rheostat arrives at a value effecting balance thereof.

12. Well borehole measurement apparatus including a drill collar having a fluid circulating duct therethrough, and containing therein: a rotary switch; a rotary rheostat; means coupling said switch and said rheostat for simultaneous rotation to effect a momentary electrical contact by said switch each time the resistance of said rheostat is at a predetermined value; means to drive said switch and said rheostat at a substantially constant speed; a bridge circuit of which said rheostat forms at least a portion of a leg thereof; means to connect a resistance to be measured in a leg of said bridge circuit; and means in said fluid circulating duct and actuated by said rotary switch for producing a pulse for each said momentary electrical contact by said rotary switch, and controlled by said bridge circuit for producing a pulse each time said rotary rheostat is at a position of balance for said bridge circuit.

13. A method for making well borehole measurements comprising: lowering drill pipe into the borehole; circulating drilling fluid down through the drill pipe; effecting in said circulating drilling fluid at a point adjacent the lower end of said drill pipe a series of three momentary flow variations, whereby three corresponding momentary variations of pressure are caused to appear in the circulating drilling fluid at the top of the well borehole; controlling, by means located in the drill pipe adjacent the lower end thereof, the ratio of the time interval between the first and second flow variations and the first and third flow variations in accordance with a predetermined function of an electric potential to be measured in the borehole adjacent the lower end of the drill pipe; and detecting and measuring the said time intervals between said pressure variations appearing in the circulating fluid at the top of the well borehole.

14. A method for making well borehole measurements comprising: lowering drill pipe into the borehole; circulating drilling fluid down through the drill pipe; effecting in said circulating drilling fluid at a point adjacent the lower end of said drill pipe a series of three momentary flow variations, whereby three corresponding momentary variations of pressure are caused to appear in the circulating drilling fluid at the top of the well borehole; controlling, by means located in the drill pipe adjacent the lower end thereof, the ratio of the time interval between the first and second flow variations and the first and third flow variations in accordance with a predetermined function of the resistance of the formation traversed by the borehole adjacent the lower end of the drill pipe; and detecting and measuring the said time intervals between said pressure variations appearing in the circulating fluid at the top of the well borehole.

15. A method for making well borehole quantity measurments comprising: lowering drill pipe into the borehole; circulating drilling fluid down through the drill pipe; effecting in said circulating drilling fluid at a point adjacent the lower end of said drill pipe a series of momentary resistance to flow variations each separated from one another by consecutive time intervals of relatively constant pressure; and controlling the length of each of said time intervals in accordance with a predetermined functional relationship to each of the corresponding quantity values existing during the said intervals.

16. A method for making well borehole quantity measurements comprising: lowering drill pipe into the borehole; circulating drilling fluid down through the drill pipe; effecting in said circulating drilling fluid at a point adjacent the lower end of said drill pipe a series of momentary resistance to flow variations each separated from one another by time intervals of relatively constant pressure; and controlling the length of said time intervals in accordance with a predetermined functional relationship to corresponding quantity values existing during the said intervals.

17. In apparatus for making well borehole quantity measurements while drilling including a drill stem having a fluid circulating duct therethrough and pump means for circulating fluid down through said duct in said drill stem; the combination comprising: flow restriction means in said drill stem in the vicinity of the lower end thereof actuatable for effecting a variable resistance to flow of fluid through said duct; actuating means to actuate said flow restriction means; sensing means for taking measures of the varying value of an electric quantity existing within a well borehole; timing means responsive to the said measures taken by said sensing means operatively connected to said actuating means for actuating said flow restricting means at times having an interval therebetween bearing a predetermined functional relationship to the said value of said quantity.

18. In apparatus for making well borehole quantity measurements while drilling including a drill stem having a fluid circulating duct therethrough and pump means for circulating fluid down through said duct in said drill stem; the combination comprising: flow restriction means in said drill stem in the vicinity of the lower end thereof actuatable for effecting a variable resistance to flow of fluid through said duct; actuating means to actuate said flow restriction means; sensing means for taking measures of the varying value of an electric potential existing within a well borehole; timing means responsive to the said measures taken by said sensing means operatively connected to said actuating means for actuating said flow restricting means at times having an interval therebetween bearing a predetermined functional relationship to the said value of said quantity.

References Cited in the file of this patent

UNITED STATES PATENTS

| Number | Name | Date |
|---|---|---|
| 1,963,090 | Jakosky | June 19, 1934 |
| 2,225,668 | Subkow et al. | Dec. 24, 1940 |
| 2,380,520 | Hassler | July 31, 1945 |
| 2,400,170 | Silverman | May 14, 1946 |
| 2,425,869 | Dillon | Aug. 19, 1947 |
| 2,507,351 | Scherbatskoy | May 9, 1950 |
| 2,524,031 | Arps | Oct. 3, 1950 |
| 2,554,174 | Doll | May 22, 1951 |